United States Patent [19]

Matsuoka et al.

[11] Patent Number: 5,065,434
[45] Date of Patent: Nov. 12, 1991

[54] IMAGE INFORMATION PROCESSING APPARATUS HAVING A MULTI-FUNCTION SWITCH

[75] Inventors: Mikiharu Matsuoka, Tokyo; Yasuko Miyazaki, Yokohama; Noboru Koumura, Tokyo, all of Japan

[73] Assignee: Canon Kabushiki Kaisha, Tokyo, Japan

[21] Appl. No.: 499,633

[22] Filed: Mar. 27, 1990

[30] Foreign Application Priority Data

Mar. 30, 1989 [JP] Japan ................................. 1-76437

[51] Int. Cl.⁵ ............................................. G09B 21/00
[52] U.S. Cl. ......................................... 382/1; 434/113
[58] Field of Search ...................... 382/1, 59; 434/113, 434/114, 116, 178, 179; 340/707, 710

[56] References Cited

U.S. PATENT DOCUMENTS

| | | | |
|---|---|---|---|
| 2,521,338 | 9/1950 | Bryce et al. | 434/114 |
| 4,263,592 | 4/1981 | Takahashi et al. | 340/707 |
| 4,274,753 | 6/1981 | Brown | 400/87 |
| 4,651,299 | 3/1987 | Miyazaki et al. | 364/900 |
| 4,793,812 | 12/1988 | Sussman et al. | 434/116 |
| 4,881,900 | 11/1989 | Matsuoka et al. | 434/113 |

FOREIGN PATENT DOCUMENTS

| | | |
|---|---|---|
| 0254554 | 1/1988 | European Pat. Off. |
| 0320886 | 6/1989 | European Pat. Off. |
| 0326129 | 8/1989 | European Pat. Off. |

OTHER PUBLICATIONS

IBM Technical Disclosure Bulletin, *Seeing Eye Mouse,* vol. 28, No. 3, Aug. 1985, pp. 1343-1344.
Magazine article entilted "The Monoselector", Medical Progress Through Technology, 13 (1988), No. 4, pp. 165-170.

*Primary Examiner*—Leo H. Boudreau
*Assistant Examiner*—Steven P. Klocinski
*Attorney, Agent, or Firm*—Fitzpatrick, Cella, Harper & Scinto

[57] ABSTRACT

An image information processing apparatus having a multi-function switch includes an image information reader for reading image information, wherein the reading frequency of the reader can be varied. A first switch is provided for switching between a first reading mode in which the image information printed on a sheet is read by the reader, and a second reading mode in which image information displayed on a screen is read by the reader. A second switch is provided for selecting between a plurality of different reading frequencies in the second reading mode. Control circuitry is provided for controlling the reader to read the image information at a predetermined reading frequency higher than the plurality of reading frequencies in the first mode, and to read the image information at one of the plurality of reading frequencies selected by the second switch in the second reading mode. The control circuitry tests whether a power supply of the apparatus is sufficient when the second switch is actuated in the first reading mode.

18 Claims, 3 Drawing Sheets

IMAGE INFORMATION PROCESSING APPARATUS HAVING A MULTI-FUNCTION SWITCH

BACKGROUND OF THE INVENTION

1. Field of the Invention

The present invention relates to an image information processing apparatus, and more particularly, to an image information processing apparatus which reads image information by using an image information reading means which reads the image information at a variable reading frequency, and switches between a first reading mode in which the reading frequency is set at a predetermined value and a second reading mode in which the reading frequency value can be varied.

2. Related Background Art

Reading apparatuses for blind persons and/or persons having impaired vision, which apparatuses read image information and output the same as tactile information, specifically as vibration patterns, are known. Among such known reading apparatuses for persons of impaired vision are apparatuses by which images displayed on a CRT (Cathode Ray Tube) display unit can be read as well as images recorded on a recording media such as paper. In those apparatuses, an image reading means comprises an image sensor composed of, for example, a CCD (Charge-Coupled Device) element, and the value of a reading frequency thereof can be varied. This varying of the setting of the frequency is necessary because there are a variety of scanning frequencies of the CRT display units, and therefore, beat noise will appear in an output signal reading the images if the reading frequency does not match to a corresponding scanning frequency of the CRT display unit.

Therefore, such reading apparatuses for persons of impaired vision are constructed to enable a reading mode of a reading means to be switched between a mode for reading images displayed on the CRT display unit and another mode for reading images recorded on a recording media. In the mode for reading the images displayed on the CRT display unit, the setting of the above reading frequency value can be varied. Alternatively, in the mode for reading the images recorded on the recording media, the reading frequency is set to a predetermined value.

Accordingly, in the construction of the prior art reading apparatuses for persons of impaired vision, a changeover switch for switching the above modes, and an input switch for varying a setting of a reading frequency value are provided.

In the reading apparatuses for persons of impaired vision (a power switch and other switches, for example, a switch for checking an output voltage of a battery as a power supply) are also provided in addition to the above two switches. To reduce the size of the reading apparatus for persons of impaired vision and improve the portability thereof, and further, to reduce the cost thereof by reducing the number of circuit elements used therein, preferably the number of switches used is kept as low as possible. Note, the operability of the apparatuses must be nevertheless maintained, regardless of the reduction of the number of switches used.

SUMMARY OF THE INVENTION

An object of the present invention is to reduce the number of switches used by providing a switch able to carry out two input functions; i.e., a function for setting a reading frequency value and an input function for inputting other items to the input switch described above, by, switching the two input functions. In the above first reading mode, the input function of the input switch is switched to the above other item input function, and thereafter, a reading frequency value can not be set. The reading frequency can be set to a predetermined value in the first mode, and accordingly, a varying of the setting of the reading frequency value is not necessary, and thus, the operability of the apparatus is maintained in the first reading mode.

BRIEF DESCRIPTION OF THE DRAWINGS

Other objects and features of the present invention will be described with reference to the accompanying drawings, in which.

DESCRIPTION OF THE PREFERRED EMBODIMENTS

The preferred embodiments of the present invention will be described below with reference to the accompanying drawings.

Figure 1:
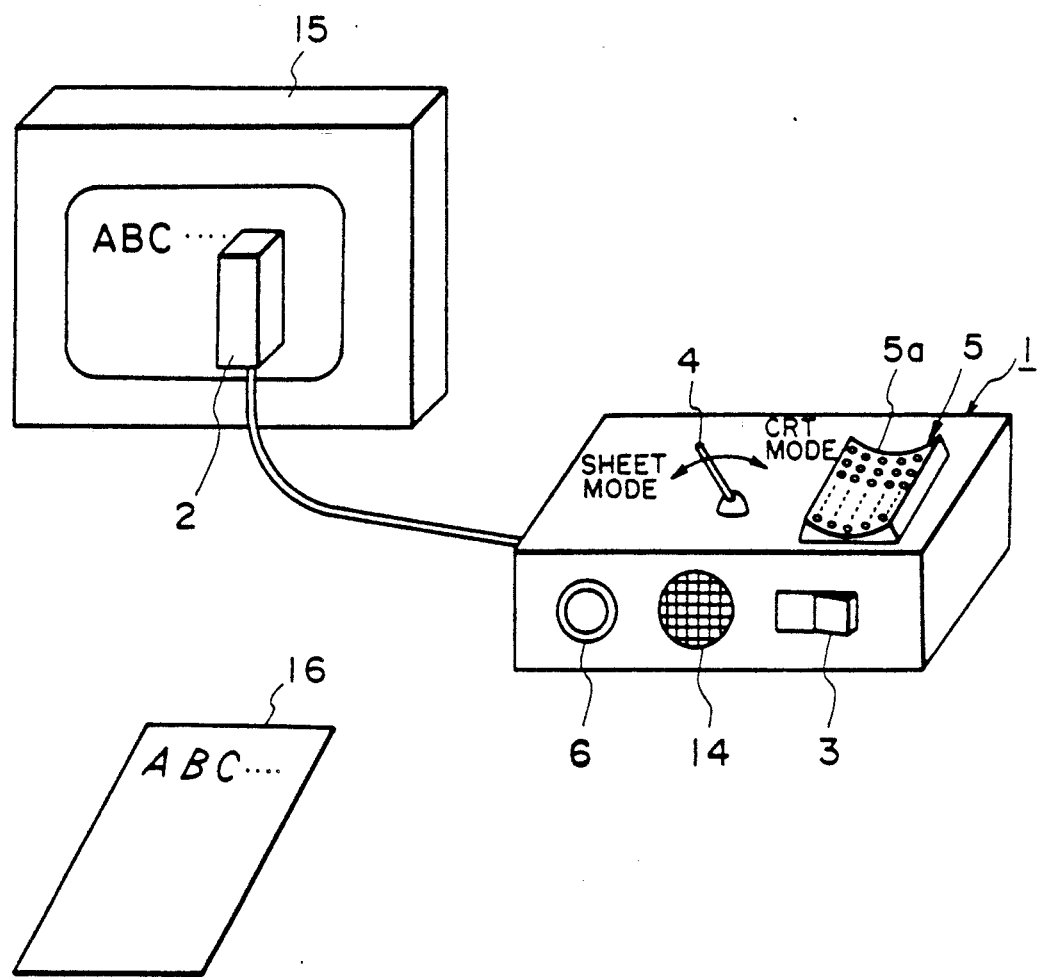
FIG. 1 is a perspective overall view of a reading apparatus in an operation state.

FIG. 1 shows an overall view of a reading apparatus for persons of impaired vision, as an embodiment of the present invention, in an operative state. In FIG. 1, reference numeral 1 denotes a main body of the reading apparatus for persons of impaired vision (hereinafter, referred to as an apparatus main body). This apparatus main body 1 is connected to a camera 2 for reading image information.

The camera 2 is constructed by an image sensor comprising, for example, a CCD element, and an optical system for focusing images at the sensor. A setting of a value of a reading frequency of the imager sensor can be varied. The camera 2 is controlled by a user, and is held and moved on a display surface of a CRT display unit to thereby read a displayed image. The camera 2 can also read images recorded on a recording sheet 16. In the embodiment of the present invention, a reading mode for reading a frequency of the camera 2 is switched as shown below. In a mode for reading the image displayed on the CRT display unit 15 (hereinafter referred to as a CRT mode), the setting of a reading frequency value is varied for example, 50 Hz, 60 Hz or 70 Hz. Alternatively, in a mode for reading the images recorded on the recording sheet 16 (hereinafter, referred to as a sheet mode), the reading frequency is set to a predetermined value, for example, 230 Hz.

The image information read by the camera 2 is input to the apparatus main body 1, converted into vibration patterns able to be tactually interpreted by the user through a tactile portion 5 provided on the apparatus main body 1, to which the patterns are output. The tactile portion 5 is composed of a matrix arrangement of 20 tactile pins arranged in rows of five, each tactile pin being driven by a Piezoelectric element in an axial direction of the pin. Those tactile pins are respectively inserted into holes, arranged in a matrix of 20 rows × five rows in a tactile panel 5a provided on an upper surface of the apparatus main body 1. The shape of the tactile panel 5a is curved to fit the lengths of the fingers of the user. Each tactile pin is selectively driven and vibrated in response to the read image information, and therefore, the user can sense the vibration patterns and recognize the image information by placing the fingers on the tactile panel 5a.

In addition to the construction described above, switches represented by reference numerals 3, 4, and 6, and a buzzer 14 are provided on the upper and side surfaces of the apparatus main body 1.

The switch 3 is a power switch for switching a power supply to the apparatus ON or OFF.

The switch 4 is a mode changeover switch for switching between the CRT mode and the sheet mode, as described above. When an actuator of the switch 4 is at the lower right side position, the mode is switched to the CRT mode, and when the actuator is at the lower left side position, the mode is switched to the sheet mode.

The switch 6 is a combined-use switch having two input functions, and is used to carry out an input function for varying the setting of the reading frequency value such as 50 Hz, 60 Hz or 70 Hz, in the CRT mode described above, and another input function for instituting a check of whether or not an output voltage of the battery (a power supply) is lower than a predetermined reference voltage in the sheet mode.

When the battery check described above is carried out, and the output voltage of the battery is lower than the reference voltage, the buzzer 14 is sounded to warn the user that the output voltage of the battery is low.

Figure 2:
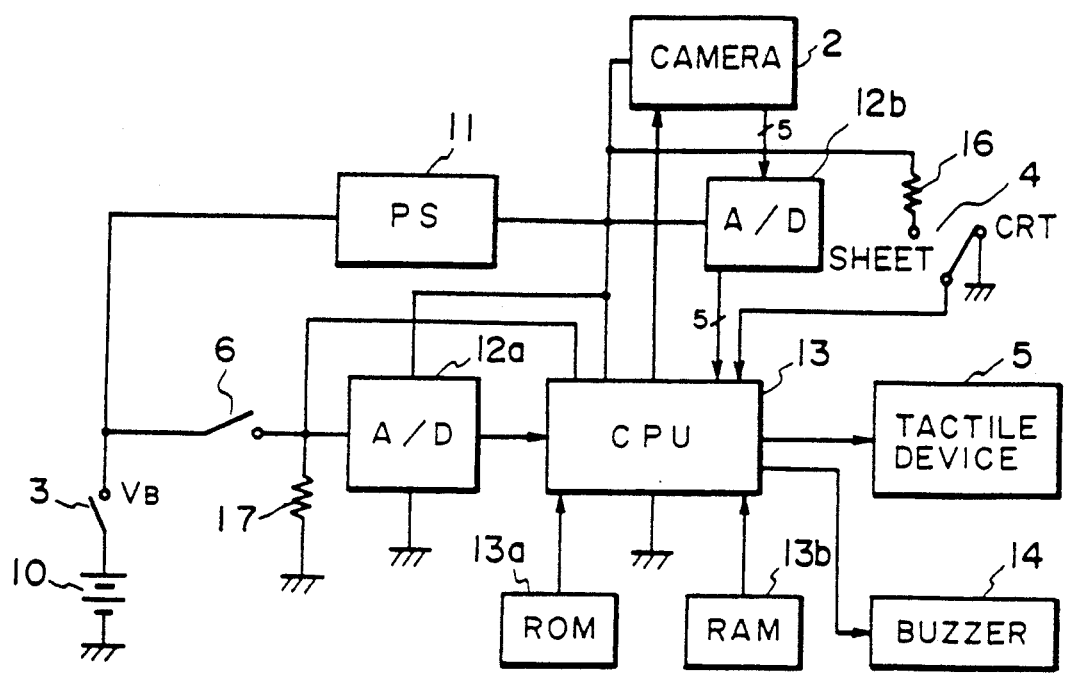
FIG. 2 is a block diagram showing a construction of a control system of the reading apparatus.

FIG. 2 shows an overall construction of a control system of the reading apparatus for persons of impaired vision according to the embodiment of the present invention. In FIG. 2, reference numeral 13 denotes a CPU (central processor unit) comprising a microprocessor device and controlling all components of the apparatus. A ROM (read-only-memory) 13a and an RAM (random-access-memory) 13b are connected to the CPU 13. The ROM 13a stores control programs executed by the CPU 13, and a variety of constant data used for controls, and the RAM 13b is used as a working area of the CPU 13 and as a buffer for storing the read image data.

The tactile portion 5 and the buzzer 14, as described above, are connected to the CPU 13 through a driver circuit (not shown), and driven under the control of the CPU 13.

Figure 3:
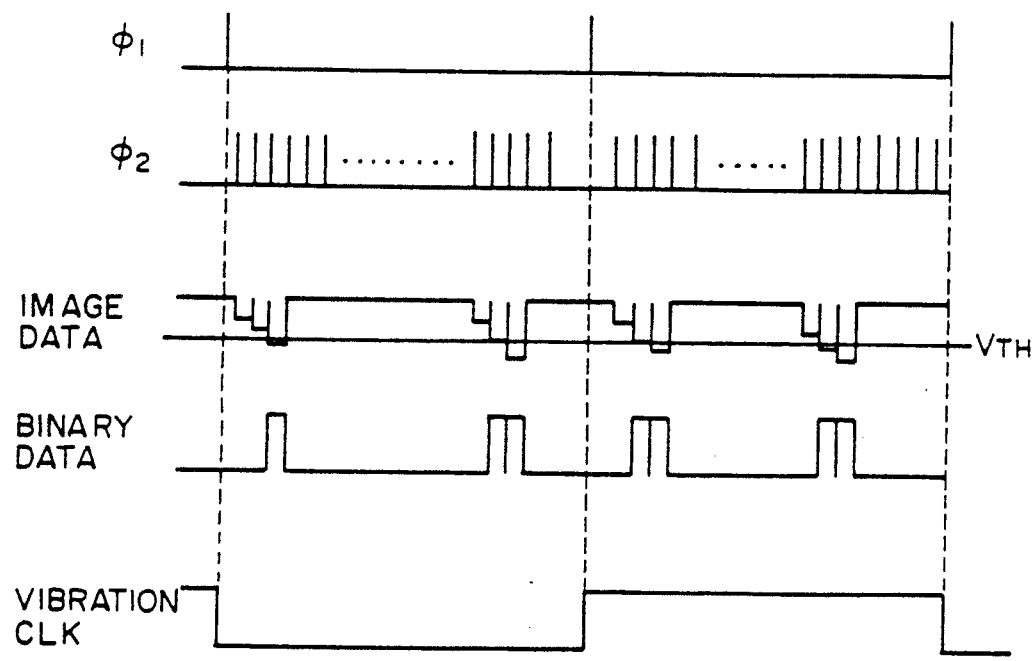
FIG. 3 is a timing chart of signals with respect to image reading operations of the reading apparatus.

The camera 2 is also connected to the CPU 13 through an A/D (analog to digital) converter 12b an input and output port (not shown). The CPU 13 outputs a synchronous signal $\phi_1$ and a clock signal $\phi_2$ to the camera 2, to effect the read operation by the camera 2. The clock signal $\phi_2$ is a pulse signal by which a timing is established for shifting a signal of the image data read by the camera 2 (the image data being stored in a memory, e.g. shift register, and arranged therein in 5 rows by 20 bits) by one bit. The synchronous signal $\phi_1$ is also a pulse signal by which a timing is established for latching the image data signal of 20 bits; one pulse thereof being output at every 20 pulses of the clock signal $\phi_2$. The read operation is carried out by the camera 2 at a timing controlled on the basis of these signals $\phi_1$ and $\phi_2$, and the image data signal of 20 bits × 5 rows is sequentially input to the A/D converter 12b in a form of five parallel rows. The image data signal input to the A/D converter 12b is an analog signal shown in the third row of FIG. 3. The A/D converter 12b encodes the image data signal in binary form by a threshold voltage $V_{TH}$, converts it to a binary coded signal shown in the fourth row of FIG. 3, and inputs it to the CPU 13. The CPU 13 outputs the input binary coded data signal and a vibration clock signal, which is synchronized with the synchronous signal $\phi_1$, to the tactile portion 5 to generate vibration patterns thereat in response to the binary coded data.

In FIG. 2, reference numeral 10 represents the battery as a power supply, and 11 a power supply circuit. The power supply circuit 11 stabilizes an output voltage $V_B$ of the battery 10 at a predetermined power voltage, and supplies the stabilized voltage to all elements of the apparatus requiring this power voltage, for example, the CPU 13. The power switch 3 described above is provided between the battery 10 and the power supply circuit, and the power is supplied or cut off by operating the power switch 3. The output voltage $V_B$ from the battery 10 is input to the A/D converter 12a through the combined-use switch 6 described above, converted to digital data, and input to the CPU 13. A resistor 17 is provided between one terminal of the combined-use switch 6 at the ground terminal of the A/D converter 12a and ground. A connecting point of the switch 6 and the resistor 17 is connected to the CPU 13. As the voltage at the connecting point is varied in response to an ON/OFF operation of the combined-use switch 6, the CPU 13 detects an ON or OFF state of the combined-use switch 6 by sensing the voltage.

The mode changeover switch 4 described above is also connected to the CPU 13, and the input of the mode changeover switch 4 is changed between a ground level voltage and a high level power supply voltage applied to an input terminal thereof from the power supply circuit 11 through a resistor 16, in response to a switching operation thereof. The CPU 13 decides the mode setting on the basis of the operation of the mode changeover switch 4; i.e., determines that the mode is the CRT mode when the input signal from the mode changeover switch 4 is low level, or the mode is the sheet mode when the input signal is high level.

As described above, the CPU 13 switches the reading mode to the CRT mode or the sheet mode in response to the input from the mode changeover switch 4. In the CRT mode, the CPU 13 defines the input function of the combined-use switch 6 as the reading frequency setting function, and sets the reading frequency at a variable value in response to the input therefrom. Here, as an example, the setting of the value of the reading frequency is varied in accordance with the number of times the combined-use switch 6 is operated. The CPU 13 sets the reading frequency to 50 Hz when the combined-switch 6 is not operated, to 60 Hz when the number of the times of operation is one, and to 70 Hz when the number of times of operation is two. The number of times of operation of the combined-use switch 6 is cyclically applied, and therefore, when the number of times of operation is three, the CPU 13 sets the reading frequency to 50 Hz, and so on. Alternatively, in the sheet mode, the CPU 13 sets the reading frequency to a predetermined value; e.g., 230 Hz. The reading of the images is carried out on the basis of the reading frequency set in either of the modes described above, and the read images are converted to the vibration patterns at the tactile portion 5 and, output therefrom. Furthermore, in the sheet mode, the CPU 13 defines the input function of the combined-use switch 6 as the battery check function. When the combined-use switch 6 is mode ON in the sheet mode, the CPU 13 determines whether or not the output voltage $V_B$ of the battery 10 is lower than the predetermined reference voltage $V_R$, and when the output voltage $V_B$ is lower than the predetermined reference voltage $V_R$, the CPU 13 causes the buzzer 14 to sound an alarm indicating that the output voltage $V_B$ of the battery 10 is low.

Figure 4:
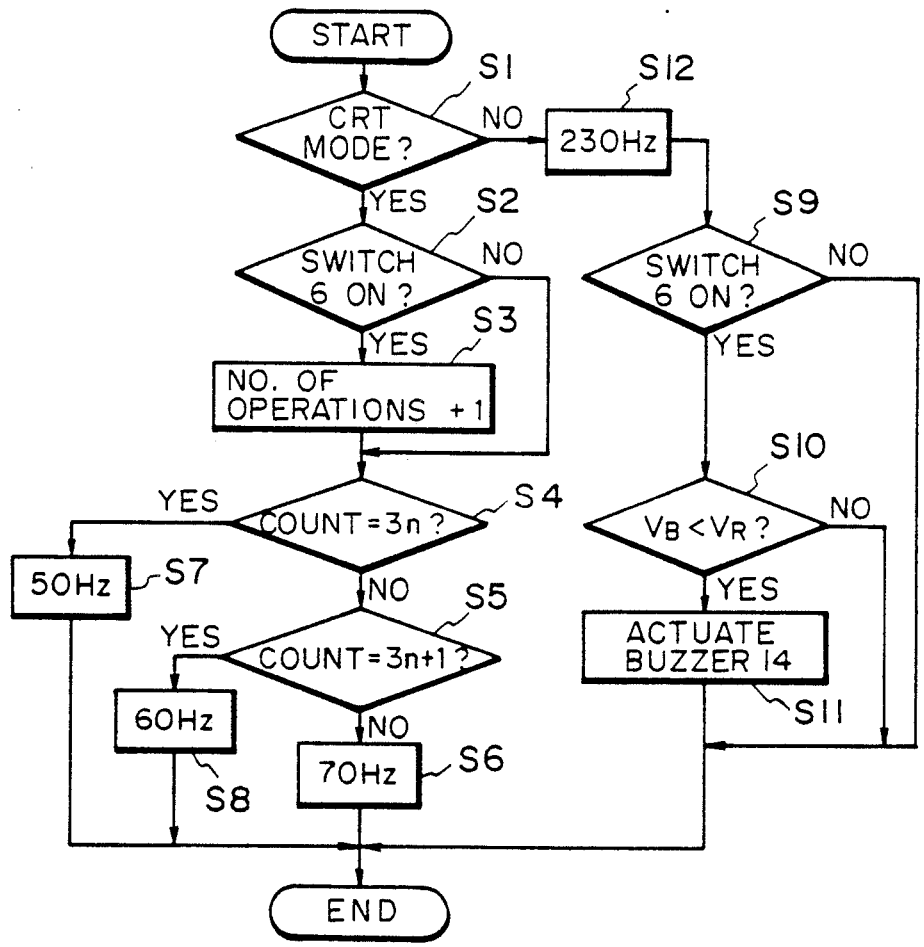
FIG. 4 is a flowchart showing a setting of the reading frequency and a battery check routine carried out by the CPU 13 shown in FIG. 2; and, FIG. 5 is a flowchart showing a setting of the reading frequency on the basis of operating times of a switch.

The detailed process for setting the reading frequency and checking the battery by the CPU 13 is carried out by the sequence shown in the flowchart of FIG. 4.

The process shown in FIG. 4 is started when the mode changeover switch 4 or the combined-use switch 6 is operated, and an interruption signal is input to the CPU 13. At step S1, the CPU 13 determines whether or not the mode now set by the input signal from the mode changeover switch 4 is the CRT mode. When the CRT mode is set, the CPU 13 carries out the processes at step S2 and the steps subsequent thereto.

At step S2, the CPU 13 determines whether or not the switch 6 is ON, as the beginning of this process. When the switch 6 is ON, at step S3, the CPU 13 increments a count value of a counter for counting the number of times of operation by one. For example, a register in the CPU 13 is used as this counter. The counter is reset by an initialization process, when the power supply of the apparatus is mode ON.

At step S4, the CPU 13 determines whether the count value of the counter is zero: $n=0$, or whether the count value is equal to $3n$, where n is a positive integer. When the count value is $3n$, at step S7, the CPU 13 sets the reading frequency at 50 Hz and the process of the CPU 13 is terminated.

When the count value is not $3n$, at step S5, the CPU 13 determines whether or not the count value is $3n+1$. When the count value is $3n+1$, at step S8, the CPU 13 sets the reading frequency at 60 Hz, and the process of the CPU 13 is terminated. On the other hand, when the count value does not meet the conditions of steps S4 and S5, at step S6, the CPU 13 sets the reading frequency at 70 Hz and the process is terminated.

When the mode is not the CRT mode, and thus the mode is defined as the sheet mode by the determination at step S1, the CPU 13 carries out the process at step S9 and the steps subsequent thereto. First, at step S12, the CPU 13 sets the reading frequency at 230 Hz, and then at step S9, determines whether or not the switch 6 is ON. If the switch 6 is not ON, the process is terminated.

When the switch 6 is ON, at step S10, the CPU 13 reads the output voltage $V_B$ of the battery 10 through the A/D converter 12a, and determines whether or not the output voltage $V_B$ is lower than the predetermined reference voltage $V_R$. When the output voltage $V_B$ is not lower than the reference voltage $V_R$, the process is terminated. On the other hand, when the output voltage $V_B$ is lower than the reference voltage $V_R$, at step S11, the CPU 13 drives the buzzer 14 to sound an alarm that the output voltage $V_B$ of the battery 10 is low, and the process is then terminated.

According to the embodiment of the present invention described above, in the CRT mode the reading frequency is set to a frequency value matching the scanning frequency value for displaying the image on the CRT display unit, and thus a better image reading is achieved without adverse noise affects due to the difference between the reading frequency value and the scanning frequency value. Also in the sheet mode, a better image reading can be carried out at a suitable reading frequency value, for example, 230 Hz. Furthermore, in the embodiment of the present invention, since the combined-use switch 6 has two input functions, i.e., the reading frequency setting function and the battery check inputting function, and the functions thereof are switched in response to the mode setting by the mode changeover switch 4, the number of the switches is reduced. As a result, the size of the apparatus is reduced, the portability thereof is improved, and the cost is also reduced due to the lowering of the number of circuit elements used.

In the sheet mode, the input function of the combined-use switch 6 is the function for instructing the battery check, and the frequency can not be set. But in the sheet mode, the reading frequency is automatically set at the predetermined constant frequency, and thus a frequency setting is not necessary, and therefore, although the combined-use switch 6 is switched to carry out the battery check, the operability of the apparatus is maintained. Note, although the input function for instituting the battery check can not be carried out in the CRT mode, the battery check is not frequently requested, and accordingly, the operability of the apparatus is not greatly affected. If the battery check is requested, it can be selected in the sheet mode.

Figure 5:
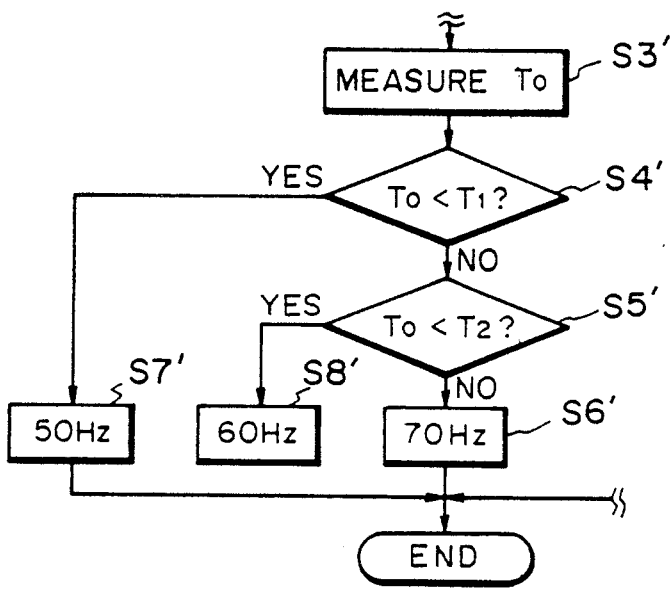

In the above construction, the setting of the value of the reading frequency is varied on the basis of the number of the times of operation of the combined-use switch 6 in the CRT mode, but the apparatus can be constructed so that the setting of the value of the reading frequency is varied on the basis of an operating time of the combined-use switch 6. In this case, the process of step S2 shown in FIG. 4 is omitted, and the processes of steps S3 to S8 are replaced by the processes of steps S3' to S8' shown in FIG. 5. In this embodiment, first, at step S3', the CPU 13 measures the operating time of the combined-use switch 6.

Next, at step S4', the CPU 13 determines whether or not the measured operating time $T_0$ is shorter than a predetermined time $T_1$. When the measured operating time $T_0$ is shorter than the time $T_1$, at step S7', the CPU 13 sets the reading frequency at 50 Hz.

On the other hand, when the measured operating time $T_0$ is not shorter than the time $T_1$, at step S5', the CPU 13 determines whether or not the measured operating time $T_0$ is shorter than a predetermined time $T_2$, which is longer than the predetermined time $T_1$. If the operating time $T_0$ is shorter than the time $T_2$, at step S8', the CPU 13 sets the reading frequency at 60 Hz.

Furthermore, if a negative judgement is obtained at both steps S4' and S5', then at step S6', the CPU 13 sets the reading frequency at 70 Hz. Namely, according to the above process, the CPU 13 can vary the setting of the value of the reading frequency on the basis of the operating time of the combined-use switch 6.

Note, the setting of the value of the reading frequency is not limited to 50 Hz, 60 Hz or 70 Hz, and 230 Hz, described above as examples. Also, in the CRT mode, the varying of the frequency value can be set at smaller intervals, e.g. 50 Hz, 55 Hz, and 60 Hz.

The construction described above is not limited to the reading apparatus for persons of impaired vision, and can be applied to other image information processing apparatuses.

As seen from the above description, in the image information processing apparatus according to the present invention, the construction includes an image information reading means, by which a setting of a reading frequency value can be varied, for reading image information, an input switch means for carrying out an input function for varying the setting of said reading frequency value and another input function for setting other items, a changeover switch means for switching between a first reading mode in which said reading frequency is set at a predetermined value, and a second reading mode in which the setting of said reading frequency value is varied in response to an input from said input switch means, and a control means for switching said input function of said input switch means in response to the mode set by said changeover switch means to said another item input function in said first reading mode or to said reading frequency setting function in said second reading mode. As a result, the number of the input switches is reduced while maintaining the operability of the apparatus, the size of the apparatus is reduced, the portability thereof is improved, and the cost of the apparatus is lowered.

What is claimed is:

1. An image information processing apparatus comprising:
   image information reading means for reading image information, wherein the reading frequency of said reading means can be varied;
   first switch means for switching between a first reading mode in which image information printed on a sheet is read by said reading means, and a second reading mode in which image information displayed on a screen is read by said reading means;
   a multi-function switch for selecting between a plurality of different reading frequencies in the second reading mode; and
   control means for controlling said reading means to read the image information at a predetermined reading frequency higher than the plurality of reading frequencies in the first reading mode, and to read the image information at one of the plurality of reading frequencies selected by said multi-function switch in the second reading mode, and for testing whether a power supply of said apparatus is sufficient when said multi-function switch is actuated in the first reading mode.

2. An image information processing apparatus according to claim 1, further comprising outputting means for outputting image information read by said reading means as tactile information.

3. An image information processing apparatus according to claim 2, wherein said control means varies a setting of a reading frequency value of said reading means in response to a number of times of operation of said multi-function switch.

4. An image information processing apparatus according to claim 2, wherein said control means varies a setting of a reading frequency value of said reading means in response to an input operating time of said multi-function switch.

5. An image information processing apparatus according to claim 1, wherein said control means varies a setting of a reading frequency value of said reading means in response to an input number of times of operation of said multi-function switch.

6. An image information processing apparatus according to claim 1, wherein said control means varies a setting of a reading frequency value of said reading means in response to an input operating time of said multi-function switch.

7. An image information processing apparatus comprising:
   first switch means for switching between a first reading mode in which a reading frequency of image information is set as a predetermined constant value and a second reading mode in which the reading frequency is selected between a plurality of values;
   a multi-function switch for selecting either one of the plurality of frequency values in the second reading mode;
   power supply means for supplying power; and
   control means for causing the image information to be read at a predetermined reading frequency in the first reading mode and causing the image information to be read at the one reading frequency selected by said multi-function switch in the second reading mode, and for testing whether the power supplied by said power supply means is sufficient when said multi-function switch is actuated in the first reading mode.

8. An image information processing apparatus according to claim 7, wherein said multi-function switch detects a capacity of a power supply of said power supply means in the first reading mode.

9. An image information processing apparatus according to claim 8, wherein said control means varies a setting of a reading frequency value in response to a number of times of operation of said multi-function switch.

10. An image information processing apparatus according to claim 8, wherein said control means varies a setting of a reading frequency value in response to an input operating time of said multi-function switch.

11. An image information processing apparatus according to claim 7, wherein said control means varies a setting of a reading frequency value in response to an input number of times of operation of said multi-function switch.

12. An image information processing apparatus according to claim 7, wherein said control means varies a setting of a reading frequency value in response to an input operating time of said multi-function switch.

13. An image information processing apparatus comprising;
   image reading means for reading image information at a reading frequency having a value which can be varied;
   outputting means for outputting the image information read by said reading means as tactile information;
   first switch means for switching between a first reading mode in which the reading frequency is set as a predetermined constant value and a second reading mode in which the reading frequency is one of a plurality of values;
   a multi-function switch for selecting one of the plurality of frequency values in the second reading mode;
   power supply means for supplying power to the apparatus;
   control means for causing said reading means to read the image information at the predetermined reading frequency in the first reading mode, and to read the image information at the one reading frequency selected by said multi-function switch in the second reading mode, and for testing whether the power supplied by said power supply means is sufficient when said multi-function switch is actuated in the first reading mode.

14. An image information processing apparatus according to claim 13, wherein said multi-function switch detects a capacity of a power supply of said power supply means in the first reading mode.

15. An image information processing appratus according to claim 14, wherein said control means varies a setting of a reading frequency value of said reading means in response to a number of times of operation of said multi-function switch.

16. An image information processing apparatus according to claim 14, wherein said control means varies a setting of a reading frequency value of said reading means in response to an input operating time of said multi-function switch.

17. An image information processing apparatus according to claim 13, wherein said control means varies a setting of a reading frequency value of said reading means in response to a number of times of operation of said multi-function switch.

18. An image information processing apparatus according to claim 13, wherein said control means varies a setting of a reading frequency value of said reading means in response to an input operating time of said multi-function switch.

* * * * *

UNITED STATES PATENT AND TRADEMARK OFFICE
CERTIFICATE OF CORRECTION

PATENT NO. : 5,065,434

DATED : November 12, 1991

INVENTOR(S) : Mikiharu MATSUOKA, et al.

It is certified that error appears in the above-identified patent and that said Letters Patent is hereby corrected as shown below:

Title page, item
[75] INVENTORS

"Noboru Koumura, Tokyo," should read --Noboru Koumura, Narashino,--

COLUMN 1:
  Line 53, "vision (a" should read --vision, a--; and
  Line 53, "switches, for" should read --switches (for--.

COLUMN 2:
  Line  3, "by," should read --by--;
  Line 56, " varied" should read --varied,--; and
  Line 68, "Piezoelectric" should read --piezoelectric--.

COLUMN 5:
  Line 68, "affects" should read --effects--.

COLUMN 6:
  Line 16, "instructing" should read --instituting--.

Signed and Sealed this

Twenty-second Day of June, 1993

Attest:

MICHAEL K. KIRK

Attesting Officer  Acting Commissioner of Patents and Trademarks